(12) United States Patent
Hällevall et al.

(10) Patent No.: US 11,371,963 B2
(45) Date of Patent: Jun. 28, 2022

(54) ULTRASONIC DETECTION SYSTEM AND METHOD

(71) Applicant: Metso Sweden AB, Trelleborg (SE)

(72) Inventors: Niclas Hällevall, Lund (SE); Cecilia Jonsson, Svedala (SE)

(73) Assignee: Metso Sweden AB, Trelleborg (SE)

( * ) Notice: Subject to any disclaimer, the term of this patent is extended or adjusted under 35 U.S.C. 154(b) by 238 days.

(21) Appl. No.: 16/614,634

(22) PCT Filed: Apr. 19, 2018

(86) PCT No.: PCT/EP2018/060098
§ 371 (c)(1),
(2) Date: Nov. 18, 2019

(87) PCT Pub. No.: WO2018/210525
PCT Pub. Date: Nov. 22, 2018

(65) Prior Publication Data
US 2020/0150093 A1    May 14, 2020

(30) Foreign Application Priority Data
May 19, 2017 (WO) ................. PCT/EP2017/062131

(51) Int. Cl.
*G01N 29/07* (2006.01)
*G01N 29/24* (2006.01)
(Continued)

(52) U.S. Cl.
CPC ............. *G01N 29/12* (2013.01); *G01N 29/07* (2013.01); *G01N 29/2437* (2013.01);
(Continued)

(58) Field of Classification Search
CPC .......... G01N 29/2437; G01N 29/4427; G01N 29/07; G01N 29/12; G01N 29/4436;
(Continued)

(56) References Cited

U.S. PATENT DOCUMENTS

| | | | |
|---|---|---|---|
| 4,909,449 | A | 3/1990 | Etheridge |
| 5,943,231 | A | 8/1999 | Thomas |

(Continued)

FOREIGN PATENT DOCUMENTS

| | | |
|---|---|---|
| DE | 150369 A1 | 8/1981 |
| EP | 3315216 A1 | 5/2018 |

(Continued)

OTHER PUBLICATIONS

Examination Report for corresponding European Patent Application No. 18720553.9 dated Mar. 29, 2021.
(Continued)

*Primary Examiner* — Jacques M Saint Surin
(74) *Attorney, Agent, or Firm* — Andrus Intellectual Property Law, LLP

(57) ABSTRACT

The disclosure relates to an ultrasonic detection system in an arrangement for handling screening material, e.g. aggregate, ore or similar. The ultrasonic detection system includes an ultrasonic transmitter arranged at a surface of the arrangement, and adapted to send out an ultrasonic signal towards the surface, an ultrasonic receiver arranged at the surface, and adapted to receive the ultrasonic signal, and a control unit connected to the at least one ultrasonic transmitter and the at least one ultrasonic receiver. The disclosure also relates to a method for monitoring operation of an arrangement for handling screening material.

28 Claims, 6 Drawing Sheets

(51) Int. Cl.
*G01N 29/44* (2006.01)
*G01N 29/12* (2006.01)

(52) U.S. Cl.
CPC ... *G01N 29/4436* (2013.01); *G01N 2291/011* (2013.01); *G01N 2291/023* (2013.01); *G01N 2291/045* (2013.01); *G01N 2291/102* (2013.01)

(58) Field of Classification Search
CPC ............ G01N 29/04; G01N 2291/023; G01N 2291/011; G01N 2291/045; G01N 2291/102
USPC .......................................................... 73/579
See application file for complete search history.

(56) References Cited

U.S. PATENT DOCUMENTS

| | | | | |
|---|---|---|---|---|
| 8,770,501 | B2* | 7/2014 | Laukka | B02C 25/00 241/29 |
| 9,339,847 | B2* | 5/2016 | Lautala | B07B 1/284 |
| 9,440,263 | B2* | 9/2016 | Miller | B07B 13/18 |
| 9,789,492 | B2* | 10/2017 | Yoon | B03B 1/04 |
| 2003/0037615 | A1* | 2/2003 | Madaras | G01N 29/11 73/598 |
| 2010/0106431 | A1* | 4/2010 | Baba | G01N 29/04 702/39 |
| 2013/0167645 | A1* | 7/2013 | Goldammer | G01N 29/04 73/602 |

FOREIGN PATENT DOCUMENTS

| | | |
|---|---|---|
| GB | 1044974 A | 10/1966 |
| JP | 61114177 A | 5/1986 |
| JP | S61 114177 A | 5/1986 |
| RU | 2195635 C1 | 2/2002 |
| SU | 1155304 | 5/1985 |
| SU | 1693530 A1 | 11/1991 |
| WO | 02/39091 A1 | 5/2002 |
| WO | 2009132128 A1 | 10/2009 |

OTHER PUBLICATIONS

Office Action and Search Report for corresponding Russian Patent Application No. 2019138725 dated May 25, 2021. (Translation included).
International Search Report and Written Opinion for International Patent Application No. PCT/EP2018/060098 dated Jun. 26, 2018.
International Search Report and Written Opinion for International Patent Application No. PCT/EP2017/062131 dated Jan. 3, 2018.
Office Action for corresponding Russian Patent Application No. 2019138725, dated Sep. 7, 2021.

\* cited by examiner

ULTRASONIC DETECTION SYSTEM AND METHOD

CROSS-REFERENCE TO RELATED APPLICATIONS

This application is the U.S. national stage application of International Application PCT/EP2018/060098, filed Apr. 19, 2018, which international application was published on Nov. 22, 2018, as International Publication WO 2018/210525 A1 in the English language. The International Application claims priority of International Patent Application PCT/EP2017/062131, filed May 19, 2017.

TECHNICAL FIELD

The invention relates to an ultrasonic detection system in an arrangement for handling screening material, e.g. material fed to a screen such as aggregate, ore or similar. The invention also relates to a method for monitoring operation of an arrangement for handling screening material.

BACKGROUND ART

Mineral material, for example rock, is gained from the earth for crushing by exploding or excavating. The rock can also be natural rock and gravel or construction waste. Mobile crushers and stationary crushing applications are used in crushing. An excavator or wheel loader normally loads the material to be crushed into the crusher's feed hopper from where the material to be crushed may fall in a jaw of a crusher or a feeder, like a conveyer, moves the rock material towards the crusher. The material to be crushed may also be recyclable material such as concrete, bricks, or asphalt.

Another common way of conveying a material in the plant is through a chute which is advantageous compared with letting it fall freely since the large amounts of dust that would otherwise occur will be reduced. Moreover, a free fall will not contain the material in a stream. In a telescopic chute, the falling material generates a pressure below atmospheric in the chute, whereby air is drawn into the space between the chute elements and dust is prevented from being spread.

The material which is crushed in a crusher is finally transported from the crusher to a screen. The product passing through the screen, or going over the screen deck, can be guided to further processing in the same plant or another plant which processes mineral material, or to a pile.

There are a number of problems that may occur when handling the material in the plant, such as material build-up, over-loaded screens, worn screen elements and over-sized material getting stuck during transport.

SUMMARY OF THE INVENTION

It is an objective of the present invention to mitigate, alleviate or eliminate one or more of the above-identified deficiencies in the art and disadvantages singly or in any combination and solve at least the above mentioned problems.

According to a first aspect, these and other objects, and/or advantages that will be apparent from the following description of embodiments, are achieved, in full or at least in part, by an ultrasonic detection system in an arrangement for handling screening material, e.g. aggregate, ore or similar. The arrangement comprises a screening deck and/or a screening duct on or in relation to which screening material is traveling.

The ultrasonic detection system comprises an ultrasonic transmitter arranged at the arrangement, and adapted to send out an ultrasonic signal towards the surface, an ultrasonic receiver adapted to receive the ultrasonic signal, and a control unit connected to the ultrasonic transmitter and the ultrasonic receiver. The control unit is adapted to detect at least one parameter of the ultrasonic signal.

The term screening material should be interpreted as material intended to be screened, transported or processed. The material could be aggregate, ore or similar.

The at least one parameter may thereafter be used to draw conclusions relating to the operational status of the arrangement.

This is advantageous in that any potential operation problems of the arrangement can be detected in a simple and reliable way. The solution is also cost efficient compared to the solutions available on the market today.

The control unit may be adapted to detect a difference in the at least one parameter based on a comparison between the ultrasonic signal and a reference signal.

When a time period is used as the comparison parameter, the control unit will detect the time period it takes for the ultrasonic signal to travel to the surface of the arrangement or the screening material present on the surface, and back to the ultrasonic receiver. That time period may thereafter be compared with the corresponding time period of a reference signal.

Specifically, the detected time period can for example be compared with a targeted time period stored in the control unit or read from a table. It can also be compared with a detected time period of a reference signal which is conducted in the same manner as described above when the arrangement is running without load, i.e. under ideal circumstances. In case the arrangement comprises a screen, the control unit may be configured to learn a stroke of a vibrating screen deck of the screen and set that as a reference value. Should the difference between the time period of the ultrasonic signal and the reference signal deviate more than a predetermined error margin it can be concluded that there is an operating deviation with arrangement, potentially indicating a problem.

The ultrasonic transmitter may be arranged close to an edge of the arrangement. The ultrasonic transmitter may further be arranged on any other part of the arrangement, such as anywhere on a screen deck, or beside, behind or below a screen deck or between adjacent screen decks. The arrangement may comprise a screen. The ultrasonic transmitter may be arranged at a screen deck of the screen being close to a discharge end of the screen deck. It may be advantageous to detect the ultrasonic signal just before the material fall off the screen deck.

The ultrasonic detection system may further comprise cleaning means connected to the control unit and arranged at the one ultrasonic transmitter and the ultrasonic receiver, wherein the control unit is adapted to control a cleaning process of the ultrasonic transmitter and/or the ultrasonic receiver using the cleaning means.

According to alternative embodiments, the ultrasonic detection system further comprises a cleaning means connected to a further control unit and arranged at the ultrasonic transmitter and the ultrasonic receiver, wherein the further control unit is adapted to control a cleaning process of the ultrasonic transmitter and/or the ultrasonic receiver using the cleaning means. The use of separate control units for controlling the ultrasonic transmitter/receiver and the cleaning means may be advantageous as it allows for an easier and more flexible system increasing the ease of customization.

The control unit may be adapted to report that a problem has been identified if the difference in the at least one parameter is outside of an acceptable interval. This implies that the control unit may be adapted to report that a problem has been identified if the difference in the at least one parameter is above a threshold value. It may further imply that that the control unit may be adapted to report that a problem has been identified if the difference in the at least one parameter is below a threshold value.

The ultrasonic detection system may further comprise a protective case at least partly housing the ultrasonic transmitter and the ultrasonic receiver.

The protective case may be inclined in relation to the surface of the arrangement, and the cleaning means may comprise air blowing means.

One or more from the ultrasonic transmitter and the ultrasonic receiver may comprise a piezo element.

The ultrasonic transmitter and the ultrasonic receiver may be constituted by one single element, the single element comprising a piezo element.

The ultrasonic transmitter and the ultrasonic receiver may be arranged at the arrangement to face each other in an opposing manner.

The at least one parameter is constituted by a time period, a frequency of the ultrasonic signal, and/or an amplitude of the ultrasonic signal.

The parameter to be analysed by the control unit can be the time period it takes for the ultrasonic signal to travel from the ultrasonic transmitter to the surface of the arrangement of the material present on the surface, and back to the ultrasonic receiver. It can also be the actual frequency or the amplitude of the ultrasonic signal as well as a combination of all of the above.

The reference signal can be constituted by a predetermined signal which for example is read from a table based on the screening material present on the screen when the ultrasonic signal is sent. It can also be constituted by an actual measurement conducted in the same manner as described above but at an earlier or later stage.

The arrangement may comprise a plant, a screen, a screening deck, a conveyor belt, a chute, a feed box or a discharge box.

According to a second aspect, these and other objects are achieved, in full or at least in part, by a screen for screening material, e.g. aggregate, ore or similar, which screen has a screen frame and screen elements arranged in the screen frame, and comprises a self-cleaning detection system according to the first aspect of the invention.

According to a third aspect, these and other objects are achieved, in full or at least in part, by a method for monitoring operation of an arrangement for handling screening material, e.g. aggregate, ore or similar. The method comprises the steps of sending out an ultrasonic signal from an ultrasonic transmitter towards a surface of the arrangement, receiving the ultrasonic signal by an ultrasonic receiver, and detecting at least one parameter of the ultrasonic signal.

The method may further comprise the step of comparing the ultrasonic signal with a reference signal based on the at least one parameter, and conducting a specific action if a difference in the at least one parameter between the ultrasonic signal and the reference signal outside of an acceptable interval.

Effects and features of the second and third aspect of the present invention are largely analogous to those described above in connection with the first aspect of the inventive concept. Embodiments mentioned in relation to the first aspect of the present invention are largely compatible with the further aspects of the invention.

According to another aspect, a cleaning detection system in an arrangement for handling screening material, e.g. aggregate, ore or similar, is provided. The cleaning system comprises at least one ultrasonic transmitter arranged at a surface of the arrangement, and adapted to send out an ultrasonic signal towards the surface, at least one ultrasonic receiver arranged at the surface, and adapted to receive the ultrasonic signal, and a protective case at least partly housing the at least one ultrasonic transmitter and the at least one ultrasonic receiver. The cleaning detection system is characterised in that it further comprises a control unit connected to the at least one ultrasonic transmitter and the at least one ultrasonic receiver, and adapted to detect a difference in at least one parameter based on a comparison between the ultrasonic signal and a reference signal.

The cleaning detection system may further comprise cleaning means arranged at the protective case, the cleaning means may in turn comprise air blowing means adapted to clean the protective case.

The control unit may be configured to control the cleaning means. For example, the control unit may be configured to activate air blowing means in timely intervals. Alternatively, the control unit may be configured to activate and control air blowing means for continuous operation.

The control unit may comprise more than one control sub unit. For example, a first control sub unit may be configured to control the cleaning means and a second control sub unit may be configured to control the ultrasonic transmitter and the ultrasonic receiver. The control sub units may be connected to each other, but alternatively, the control sub units may be operating independent from each other. The cleaning detection system may be actively checked for dirt and, in case dirt is detected, the cleaning means may be activated to clean the system.

The at least one ultrasonic transmitter and the at least one ultrasonic receiver may be constituted by one single element, wherein the single element comprises a piezo element.

The at least one ultrasonic transmitter and the at least one ultrasonic receiver may be comprised in one single unit.

The at least one ultrasonic transmitter and the at least one ultrasonic receiver may be arranged at the arrangement to face each other in an opposing manner.

The signal may be sent out in a direction substantially perpendicular to the surface of the arrangement.

The signal may be sent out in a direction forming an oblique angle to the surface of the arrangement.

The angle may be adjustable to allow optimizing the system.

The at least one parameter may be constituted by a time period, a frequency of the ultrasonic signal, and/or an amplitude of the ultrasonic signal.

The control unit may be adapted to report that problem has been identified if the difference in the at least one parameter is outside of an acceptable interval.

The control unit may further be connected to the cleaning means, and adapted to initiate cleaning of the protective case by means of the cleaning means at predetermined time intervals.

The arrangement may comprise a plant, a screen, a screening deck, a conveyor belt, a chute, a feed box or a discharge box.

According to yet another aspect, a method for detecting a cleaning requirement of an arrangement for handling screening material, e.g. aggregate, ore or similar, is provided. The method comprises the steps of sending out an ultrasonic signal towards a surface of the arrangement, and receiving the ultrasonic signal. The method is characterised by the step of detecting a difference in at least one parameter based on a comparison between the ultrasonic signal and a reference signal.

The method may further comprise the step of conducting a specific action if the difference in the at least one parameter is outside of an acceptable interval.

According to yet another aspect, a detection system in an arrangement for handling screening material, e.g. aggregate, ore or similar, is provided.

The detection system comprises two or more ultrasonic transmitters, arranged at different positions of the arrangement and, each, adapted to send out an ultrasonic signal towards a surface of the arrangement, and two or more ultrasonic receivers, each adapted to receive the respective ultrasonic signal. The detection system is characterised in that it further comprises a control unit connected to the ultrasonic transmitters and the two or more ultrasonic receivers, and adapted to detect a difference in at least one parameter based on a comparison between the ultrasonic signals and a reference signal.

By comparing the parameters of the ultrasonic signals, information regarding for example the material distribution over the surface of the screen can be evaluated.

According to an embodiment, an ultrasonic transmitter and an ultrasonic receiver are comprised in one single unit, referred to as an ultrasonic detection unit. A detection system in an arrangement comprising two or more ultrasonic detection units is thus provided.

According to an embodiment, the detection system comprises two ultrasonic units. The two ultrasonic units can be arranged at different positions of the arrangement, such as along the extension of a screening deck. As an example, a first ultrasonic unit can be arranged at a first side of the screening deck whereas a second ultrasonic unit can be arranged in parallel with the first ultrasonic unit at a second side of the screening deck. By means of the control unit connected to a monitoring system, the material flow of each of the first and second sides of the screening deck can be monitored and evaluated, giving an indication of the material distribution.

According to an embodiment, the detection system comprises a mesh comprising at least six ultrasonic transmitters and six ultrasonic receivers distributed over the surface of a screening deck of the arrangement deck. By arranging a mesh comprising plurality of ultrasonic transmitters and ultrasonic receivers, or ultrasonic detection units over the surface of the screening deck, the material flow thereon can be evaluated and monitored over a larger area. This provides the possibility of detecting an abnormality, such as a tilting screen or uneven material distribution, at an early stage and thus allowing for an early remedy of such an abnormality. Thereby, the operation efficiency of the screening arrangement is increased.

According to an embodiment, the detection system comprises a moveable structure on which one or more ultrasonic units is arranged. The moveable structure can be used to move the ultrasonic unit in accordance with a pattern, preferably according to a predetermined pattern, such that the whole surface, or at least preferred parts thereof, of the screening deck can be covered.

The at least one ultrasonic transmitter and the at least one ultrasonic receiver may be constituted by one single element, wherein the single element comprises a piezo element.

The at least one ultrasonic transmitter and the at least one ultrasonic receiver may be arranged at the arrangement to face each other in an opposing manner.

The signal may be sent out in a direction substantially perpendicular to the surface of the arrangement.

The signal may be sent out in a direction forming an oblique angle to the surface of the arrangement.

The angle may be adjustable to allow optimizing the system.

The at least one parameter may be constituted by a time period, a frequency of the ultrasonic signal, and/or an amplitude of the ultrasonic signal.

The control unit may be adapted to report that a problem has been identified if the difference in the at least one parameter is outside of an acceptable interval.

The arrangement may comprise a plant, a screen, a screening deck, a conveyor belt, a chute, a feed box or a discharge box.

According to yet another aspect, a bed depth detection system in an arrangement for handling screening material, e.g. aggregate, ore or similar, is provided. The bed depth detection system comprises at least one ultrasonic transmitter arranged at a portion the arrangement on or in relation to which the screening material is traveling, and adapted to send out an ultrasonic signal towards the surface, and at least one ultrasonic receiver adapted to receive the ultrasonic signal. The bed depth detection system is characterised in that it further comprises a control unit connected to the at least one ultrasonic transmitter and the at least one ultrasonic receiver, and adapted to calculate a bed depth of the screening material present on the surface from a comparison between the ultrasonic signal and a reference signal based on at least one parameter.

The bed depth detection system may be arranged at a portion of the arrangement being close to an edge of the arrangement. The arrangement may comprise a screen. The bed depth detection system may be arranged at any portion of a screen deck, such as for example close to a discharge end of the screen deck. It may be advantageous to detect the bed depth on the material on the screen deck just before the material fall off the screen deck.

The at least one ultrasonic transmitter and the at least one ultrasonic receiver may be constituted by one single element, the single element comprising a piezo element.

The at least one ultrasonic transmitter and the at least one ultrasonic receiver may be comprised in one single unit.

The at least one ultrasonic transmitter and the at least one ultrasonic receiver may be arranged at the surface of the arrangement to face each other in an opposing manner.

The bed detection system may comprise two or more ultrasonic transmitters and two or more ultrasonic receivers positioned to detect the bed depth at different portions of a surface of a screen deck. This may allow material distribution over the surface of the screen to be monitored and evaluated. An ideal distribution of the material may be the same bed thickness over an entire width of the screen deck whereas the bed depth will decrease from an upstream position towards a downstream position.

The signal may be sent out in a direction substantially perpendicular to the surface of the arrangement on or in relation to which the screening material is traveling.

The signal may be sent out in a direction forming an oblique angle to the surface of the arrangement.

The at least one parameter is constituted by a time period, a frequency of the ultrasonic signal, and/or an amplitude of the ultrasonic signal.

The control unit may be adapted to report that problem has been identified if the calculated bed depth is outside of an acceptable interval.

The control unit may be adapted to operate the arrangement based on information from the ultrasonic signal.

The arrangement may comprise a screen, a screening deck, a conveyor belt, a chute, a feed box or a discharge box.

According to yet another aspect, a method for detecting a bed depth of a screening material, e.g. aggregate, ore or similar, is provided. The method comprising the steps of sending out an ultrasonic signal towards a surface on or in relation to which the screening material is traveling, and receiving the ultrasonic signal. The method is characterised by the step of calculating the bed depth of the screening material present on the surface from a comparison between the ultrasonic signal and a reference signal based on at least one parameter.

According to an embodiment, the method may further comprise the step of monitoring the bed depth calculated from two or more ultrasonic signals and identifying a problem in the arrangement based on the monitored bed depths. As an example, the bed depth is calculated from two ultrasonic signals received by ultrasonic receivers arranged at different positions of a screening deck and monitored in parallel allowing a comparison of the bed depth of the two positions of the screening deck. This allows for monitoring and evaluating the material distribution on the screening deck.

A problem detected may be a tilting screen of a screen deck of the arrangement. By detecting this problem, it can be deduced that a support structure of the screen is damaged, for example that a spring is missing, causing the screen to tilt. A tilting screen can cause unusual wear on the screening deck and it is therefore an advantage to detect this problem at an early stage such that it can be repaired.

A problem detected may be an overload of a screen deck of the arrangement. Such a problem is detectable when one bed depth calculated from one ultrasonic signal, received from a first position of the surface of the screening deck, is continuously larger than a bed depth calculated from an ultrasonic signal received from a second position of the surface, and near a pre-set critical limit for the bed depth.

A problem detected may be a lost screening module. Such event would be detectable in that the bed depth on the position of that screening module would become negative and the bed depth at the screening module downstream of the lost module all of a sudden would become zero and also in that the bed depth on a corresponding position on a subjacent screen deck suddenly would increase.

A problem detected may be an uneven material distribution on a screening deck of the arrangement. Such a problem is detectable when one bed depth calculated from one ultrasonic signal, received from a first position of the surface of the screening deck, is continuously larger than a bed depth calculated from an ultrasonic signal received from a second position of the surface. This will cause more wear on the part of the screening deck where the bed depth is larger, reducing thereby the efficiency of the screen. It is thus desirable to detect such a problem as early as possible in the process in order to remedy the same for a fully efficient screening arrangement.

The method may further comprise the step of conducting a specific action if the calculated bed depth is outside of an acceptable interval.

According to yet another aspect, a detection system in an arrangement for handling screening material, e.g. aggregate, ore or similar, is provided. The detection system comprises at least one ultrasonic transmitter arranged at the arrangement and adapted to send out an ultrasonic signal towards the surface, at least one ultrasonic receiver adapted to receive the ultrasonic signal, and at least one reflector arranged for deflecting the ultrasonic signal. The detection system is characterised in that it further comprises a control unit connected to the at least one ultrasonic transmitter and the at least one ultrasonic receiver, and adapted to detect a difference in at least one parameter based on a comparison between the ultrasonic signal and a reference signal.

The reflector allows deflecting the ultrasonic signal sent out by the ultrasonic transmitter towards a surface which is at an angle from the transmitter. Correspondingly, the reflector further deflects the ultrasonic signal reflected back from the surface to the ultrasonic receiver. Thereby, positions of the arrangement in which the ultrasonic transmitter and the ultrasonic receiver are not mountable due to limited access or other, can still be subjected to the signal such that the at least one parameter of the ultrasonic signal can be detected therefrom.

According to an embodiment of the detection system, the reflector is arranged in a blind zone of the ultrasonic transmitter.

According to an embodiment of the detection system, the reflector is arranged at a distance from the ultrasonic transmitter and the ultrasonic receiver and at a portion of the arrangement different from the structure at which the ultrasonic transmitter and the ultrasonic receiver are arranged. As an example, the reflector can be arranged at a portion inside the arrangement and the ultrasonic transmitter and the ultrasonic receiver can be arranged at or in line with an opening of a wall of the arrangement. Thereby, the ultrasonic transmitter and the ultrasonic receiver can be arranged at a distance from the material processing environment, avoiding subjecting these parts to any dirt and vibrations therefrom.

According to an embodiment of the detection system, the reflector is arranged at the same structure of the arrangement as the ultrasonic transmitter and the ultrasonic receiver.

According to an embodiment of the detection system, the reflector is arranged at a non-vibrating surface of the arrangement. This provides a stable reflection of the ultrasonic signal.

According to an embodiment of the detection system, the reflector is arranged at a vibrating surface of the arrangement. This might be necessary to direct the ultrasonic signal towards a surface of particular interest. The ultrasonic receiver is, in this embodiment, adapted to detect an average value of the signal reflected by the vibrating reflector.

According to an embodiment of the detection system, the reflector is arranged at an angle of 45° with respect to the plane in which the ultrasonic transmitter is arranged. This allows for a deflection of the ultrasonic signal of 90°, and thereby parameters of a surface arranged vertically from the plane of the ultrasonic transmitter can be obtained. The ultrasonic transmitter can therefore be arranged at a structure at which it is not subjected to the working environment.

According to an embodiment of the detection system, the reflector, the ultrasonic transmitter and the ultrasonic receiver are comprised in one single unit. The single unit may comprise a protective case which at least partly houses the ultrasonic transmitter, the ultrasonic receiver and the reflector. An advantage of such a single unit is that it can be arranged at a structure in the working environment of the arrangement at an angle from a surface to be subject to analysis. At least partly housed by the protective case, the ultrasonic transmitter and the ultrasonic receiver are protected from dust and dirt of the working environment. The single unit may also comprise a cleaning means as previously disclosed herein.

The at least one ultrasonic transmitter and the at least one ultrasonic receiver may be constituted by one single element, wherein the single element comprises a piezo element.

The signal may be sent out in a direction substantially perpendicular to the surface of the arrangement.

The signal may be sent out in a direction forming an oblique angle to the surface of the arrangement.

The angle may be adjustable to allow optimizing the system.

The at least one parameter may be constituted by a time period, a frequency of the ultrasonic signal, and/or an amplitude of the ultrasonic signal.

The control unit may be adapted to report that problem has been identified if the difference in the at least one parameter is outside of an acceptable interval.

The arrangement may comprise a plant, a screen, a screening deck, a conveyor belt, a chute, a feed box or a discharge box.

Other objectives, features and advantages of the present invention will appear from the following detailed disclosure, from the attached claims, as well as from the drawings. It is noted that the invention relates to all possible combinations of features.

Generally, all terms used in the claims are to be interpreted according to their ordinary meaning in the technical field, unless explicitly defined otherwise herein.

All references to "a/an/the [element, device, component, means, step, etc.]" are to be interpreted openly as referring to at least one instance of said element, device, component, means, step, etc., unless explicitly stated otherwise.

As used herein, the term "comprising" and variations of that term are not intended to exclude other additives, components, integers or steps.

As used herein, the term "ultrasonic signal" and variations of that term should be interpreted as the total ultrasonic sound wave pattern resulting from initiating a transmission from the ultrasonic transmitter. Hence, the ultrasonic signal comprises the emitted "clean" wave pattern propagating away from the ultrasonic transmitter as well as any reflected wave patterns originating from said transmitted wave pattern.

BRIEF DESCRIPTION OF THE DRAWINGS

The above, as well as additional objects, features and advantages of the present invention, will be better understood through the following illustrative and non-limiting detailed description of embodiments of the present invention, with reference to the appended drawings, where the same reference numerals may be used for similar elements, and wherein.

DETAILED DESCRIPTION OF PREFERRED EMBODIMENTS OF THE INVENTION

Figure 1:
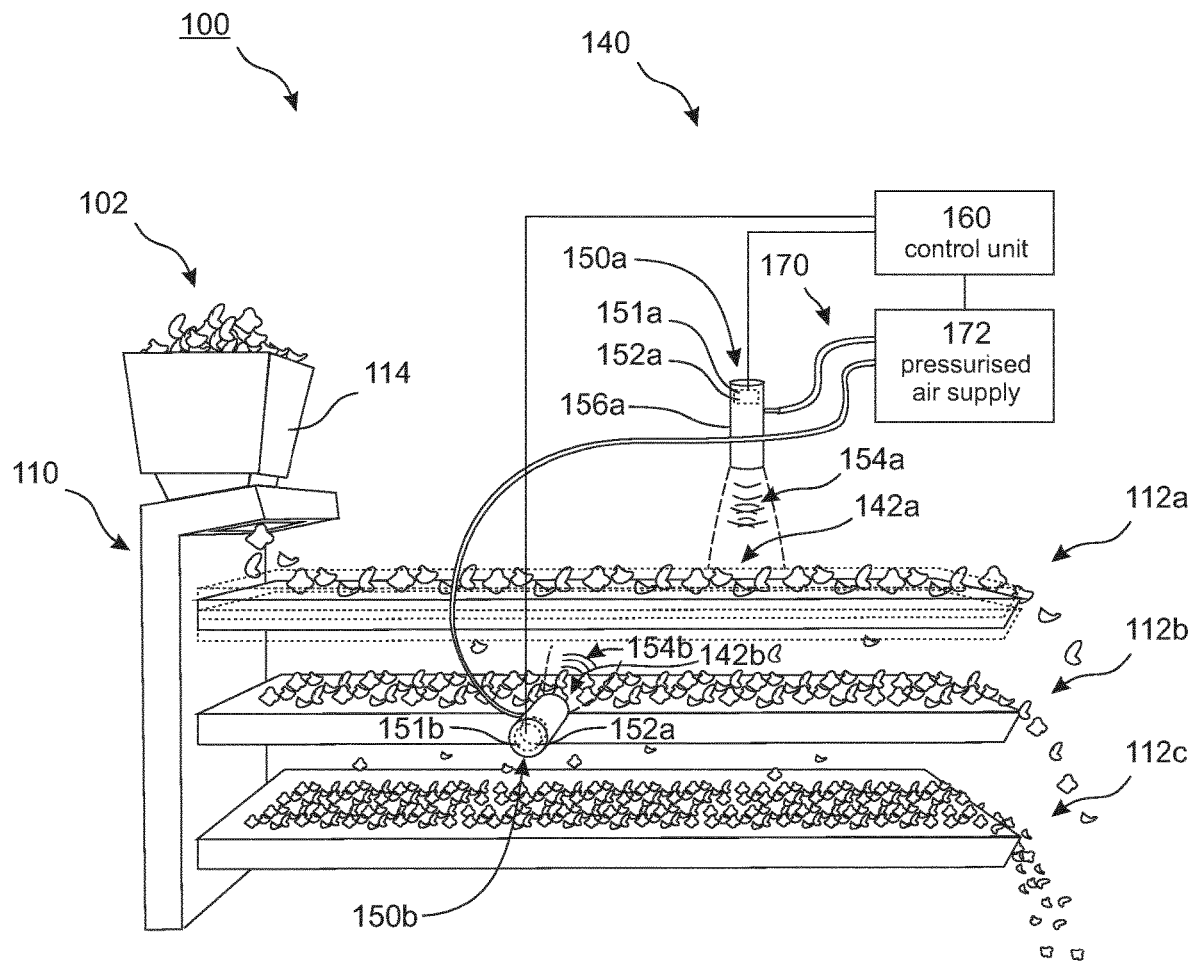
FIG. 1 is a perspective side view of an arrangement comprising a screen and an ultrasonic detection system according to embodiments of the disclosure.

FIG. 1 illustrates an arrangement 100 for handling screening material 102, e.g. aggregate, ore or similar, according to an example embodiment.

The arrangement 100 comprises a screen 110 comprising at least one screen deck 112a, 112b, 112c (in the example: three screen decks). The at least one screen deck 112a, 112b, 112c is attached to vibrating means (not shown) arranged to cause a vibration of the at least one screen deck 112a, 112b, 112c. The vibration causes the at least one screen deck 112a, 112b, 112c to be located at different positions at different times. Specifically, the vibration causes the at least one screen deck 112a, 112b, 112c to be located at different vertical positions for different times. This is illustrated for an uppermost screen 112a of the at least one screen deck 112a, 112b, 112c in FIG. 1. The vibration means is not explicitly disclosed herein. It should be understood that many alternative ways exist for achieving said vibrations within the scope of the claims.

The screen 110 further comprises input means 114 arranged to input screening material onto the at least one screen 112a, 112b, 112c. For the screen 110, the screening material 102 is input, via the input means 114, onto an uppermost screen deck 112a. The uppermost screen deck 112a has a plurality of through holes covering a portion of its surface. As the uppermost screen deck 112a vibrates, screening material 102 located thereon will be caused to move around. Pieces of the screening material 102 with dimensions smaller than the dimensions of the through holes are allowed to leave the uppermost screen deck 112a via the plurality of through holes, ending up at a middlemost screen deck 112b located under the uppermost screen deck 112a. Screening material with dimensions larger than the dimensions of the through holes of the uppermost screen deck 112a is allowed to leave the uppermost screen deck 112a at an end thereof, as illustrated in FIG. 1. The middlemost screen deck 112b has a plurality of through holes wherein the through holes have dimensions smaller than the dimensions of the through holes of the uppermost screen deck 112a. Thus, as the middlemost screen deck 112b vibrates, screening material 102 located thereon will be caused to move around. Pieces of the screening material 102 with dimensions smaller than the dimensions of the through holes of the middlemost screen deck 112b are allowed to leave the middlemost screen deck 112b via the plurality of through holes, ending up at a lowermost screen deck 112c located under the middlemost screen deck 112b. As for the uppermost screen deck 112a, screening material 102 on the middlemost screen deck 112b with dimensions larger than the dimensions of the through holes of the middlemost screen deck 112b is allowed to leave the middlemost screen deck 112b at an end thereof. The same process is repeated for the lowermost screen deck 112c.

Thus, it is understood that the purpose of the screen 102 is to sort, or separate, the screening material 102 according to their size. To the end, this is achieved by collecting the screening material 102 leaving each screen deck at an edge thereof, and, for the smallest dimensions, under the lowermost screen deck 112c.

The arrangement 100 further comprises an ultrasonic detection system 140.

The ultrasonic detection system 140 comprises an ultrasonic transmitter 151a arranged at a surface 142a of the arrangement 100. The ultrasonic transmitter 151a is adapted to send out an ultrasonic signal 154a towards the surface 142a.

The ultrasonic detection system 140 further comprises an ultrasonic receiver 152a arranged at the surface 142a, and adapted to receive the ultrasonic signal 154a.

The ultrasonic transmitter 151a and the ultrasonic receiver 152a may be constituted by one single element. Such a single element may be a transceiver. Specifically, for the ultrasonic detection system 140, the ultrasonic transmitter 151a and the ultrasonic receiver 152a are constituted by one single element, the single element comprising a piezo element.

Alternatively, the ultrasonic transmitter 151a and the ultrasonic receiver 152a may be constituted by one single element the single element comprising a capacitive transducer.

The sound waves transmitted by the ultrasonic transmitter 151a (i.e. the ultrasonic signal 154a) may be in the ultrasonic range, with an operating frequency, f, above 20 kHz. One typical operating frequency range is 90 kHz<f<150 kHz. However, it is understood that the choice of operating frequency affects the effective distance that may be used for detection as a result from the attenuation losses of the sound waves increasing with operating frequency. Hence, the operating frequency may depend on the application.

The ultrasonic detection system 140 may be used for monitoring operation of the arrangement that handles the screening material 102. A method for monitoring operation of an arrangement such as the arrangement 100 comprises the steps of sending out an ultrasonic signal 154a from ultrasonic transmitter 151a towards a surface 142a of the arrangement 100, receiving the ultrasonic signal 154a by ultrasonic receiver 152a, and detecting at least one parameter of the ultrasonic signal 154a.

The method may further comprise the step of comparing the ultrasonic signal 154a with a reference signal based on the at least one parameter.

The method may further comprise the step of conducting a specific action if a difference in the at least one parameter between the ultrasonic signal 154a and the reference signal is outside of an acceptable interval. The ultrasonic detection system 140 further comprises a control unit 160 connected to the ultrasonic transmitter 151a and the ultrasonic receiver 152a. The control unit 160 is adapted to detect at least one parameter of the ultrasonic signal 154a.

The at least one parameter may be constituted by a time period. In such a case, the ultrasonic detection system 140 may be arranged to detect a distance to a target by determining a time delay between a time of transmitting and a time of receiving an ultrasonic signal 154a transmitted in a direction of the target. The distance to the target may then be calculated with knowledge of the speed of sound. The target may be the surface 142a, the material present on the surface 142a or a combination of the surface 142a and the material present onto the surface 142a.

Alternatively, the at least one parameter may be constituted by a frequency of the ultrasonic signal 154a. In such a case, the ultrasonic detection system 140 may be arranged to detect a speed of a target with respect to the ultrasonic detection system 140. The speed of the target may be calculated with knowledge of the speed of sound by utilizing the formulation of the Doppler effect for sound waves.

Alternatively, the at least one parameter may be constituted by an amplitude of the ultrasonic signal 154a. In such a case, the ultrasonic detection system 140 may be arranged to detect surface properties of a target.

Although discussed separately, any combination of the properties of time, frequency and amplitude may be used to achieve a purpose of the ultrasonic detection system 140. Other properties may also be used. For example, the spatial distribution of the ultrasonic signal 154a may be used to infer properties of the target. For such a case, the ultrasonic receiver 152a may comprise a spatially resolving sensor. Furthermore, the properties of the ultrasonic signal 154a transmitted by the ultrasonic transmitter 152a may be different depending on the purpose. For example, the ultrasonic signal 154a may be pulsed or continuous. Furthermore, the base frequency of the ultrasonic signal 154a may vary dependent on the purpose.

The control unit 160 may be adapted to detect a difference in the at least one parameter based on a comparison between the ultrasonic signal 154a and a reference signal. The reference signal may be for example the signal detected by the control unit 160 in a case where no screening material is affecting the ultrasonic signal 154a. For example, a reference signal may be recorded and stored when the screen 100 is empty. Alternatively, or additionally, a reference signal may be the signal detected by the control unit 160 for a specific position of the vibrating screen. For example, the reference signal may be the signal detected by the control unit 160 when a screen deck is in its default position.

There are numerous advantages and usefulness of the ultrasonic detector of the disclosure. This will be further discussed later in the detailed description. For example, the control unit 160 may be adapted to report that problem has been identified if the difference in the at least one parameter is outside of an acceptable interval. The report may comprise for the control unit 160 to issue an alarm and/or notification. Alternatively, or additionally, the control unit 160 may initiate a command initiating an action solving, or at least mitigating, the problem. The command may be issued to a further unit, or internally within the control unit 160. The command may pertain to initiating a calculation such as to derive for example a physical parameter. Alternatively, or additionally, the command may pertain to the control unit 160 (or further unit) to initiate a control action with regards to the arrangement 100. Specifically, for the arrangement 100, the control unit 160 may initiate a command pertaining to controlling the operation of the vibrating means. This may include for example adjusting the vibrating frequency or stopping the vibrations. Alternatively, the control unit 160 may initiate a command pertaining to controlling the operation of the input means 114 for controlling the feed rate therefrom.

The ultrasonic detection system 140 further comprises cleaning means 170 connected to the control unit 160 and arranged at the ultrasonic transmitter 151a and the ultrasonic receiver 152a. The control unit 160 is adapted to control a cleaning process of the ultrasonic transmitter 151a and/or the ultrasonic receiver 152a by means of the cleaning means 170. The cleaning means 170 allows for using the ultrasound detection system 140 in harsh and dusty environment without risking detection efficiency to decrease during operation.

The cleaning means 170 comprises air blowing means having a pressurized air supply 172. The air blowing means is fluidly connected to the ultrasonic transmitter 151a and the ultrasonic receiver 152a. The control unit 170 is adapted to control the pressurised air supply such as to inject pressurised air for keeping the ultrasonic transmitter 151a and the ultrasonic receiver 152a clean. The pressurized air may be injected as bursts occurring with regular time intervals. Alternatively, the pressurized air may be injected continuously. The control unit 170 may be adapted to control the flow of pressurized air through the conduits. This may be achieved by adjusting the air pressure of the pressurised air supply 172. Alternatively, or additionally, it may be achieved by adjusting a cross section of the conduit for example using a throttle or a variable valve.

The ultrasonic detection system 140 further comprises a protective case 156a at least partly housing the ultrasonic transmitter 151a and the ultrasonic receiver 152a. One purpose of the protective case 156a is to protect the ultrasonic detection 140 from exposure from contaminants such as dirt or dust, both in wet and dry conditions. Another purpose of the protective case 156a is to control the spatial distribution of the transmitted ultrasonic signal 154a. This is achieved by the sound waves being reflected on an inner wall of the protective case 156a. The surface structure of the inner wall of the protective case 156a will be of importance. A rugged surface may result in back reflections, risking to affect the spatial distribution and/or penetration length of the transmitted ultrasonic signal 154a. Moreover, back reflections may result in deteriorated readings when detecting the ultrasonic signal 154a using the at least one ultrasonic receiver 152a. The details with regards to the cleaning of the ultrasound detections system will be further discussed later.

The at least one ultrasonic transmitter 151a and the at least one ultrasonic receiver 152a may be mounted inside the protective case 156a such as to form a single ultrasonic detection unit 150a. The ultrasonic detection unit 150a may be mounted onto a frame of the arrangement. The ultrasonic detection unit 150a may be translationally attached such as to allow adjusting the distance between the ultrasonic detection unit 150a and the surface 142a.

The arrangement 100 further comprises a second ultrasonic detection unit 150b adapted to measure properties pertaining to the middlemost screen deck 112b. The second ultrasonic detection unit 150b is arranged at a second surface 142b of the arrangement 100. The second ultrasonic detection unit 150b is arranged to transmit ultrasonic signal 154b directed substantially horizontally such that the ultrasonic signal 154b hits the screening material present on the middlemost screen deck 112b from the side. The second ultrasonic detection unit 150b will detect an ultrasonic signal 154b predominately originating from reflections on the screening material 102. Thus, it is understood that the second ultrasonic detection unit 150b provides different kind of information than the ultrasonic detection unit 150a, which may provide information from both the screening material and the surface 142a. The second ultrasonic detection unit 150b is connected to the control unit 160 and fluidly connected to the pressurised air supply 172.

The ultrasound detection system is preferably being located in a non-vibrating position, for example on a supporting frame of the arrangement. This improves the reliability and durability of the system over time. The ultrasound detection system may, however, be arranged to vibrate with the arrangement. This may be an advantage in some applications where other detection means and/or detection angles are not adequate for the task.

Figure 2:
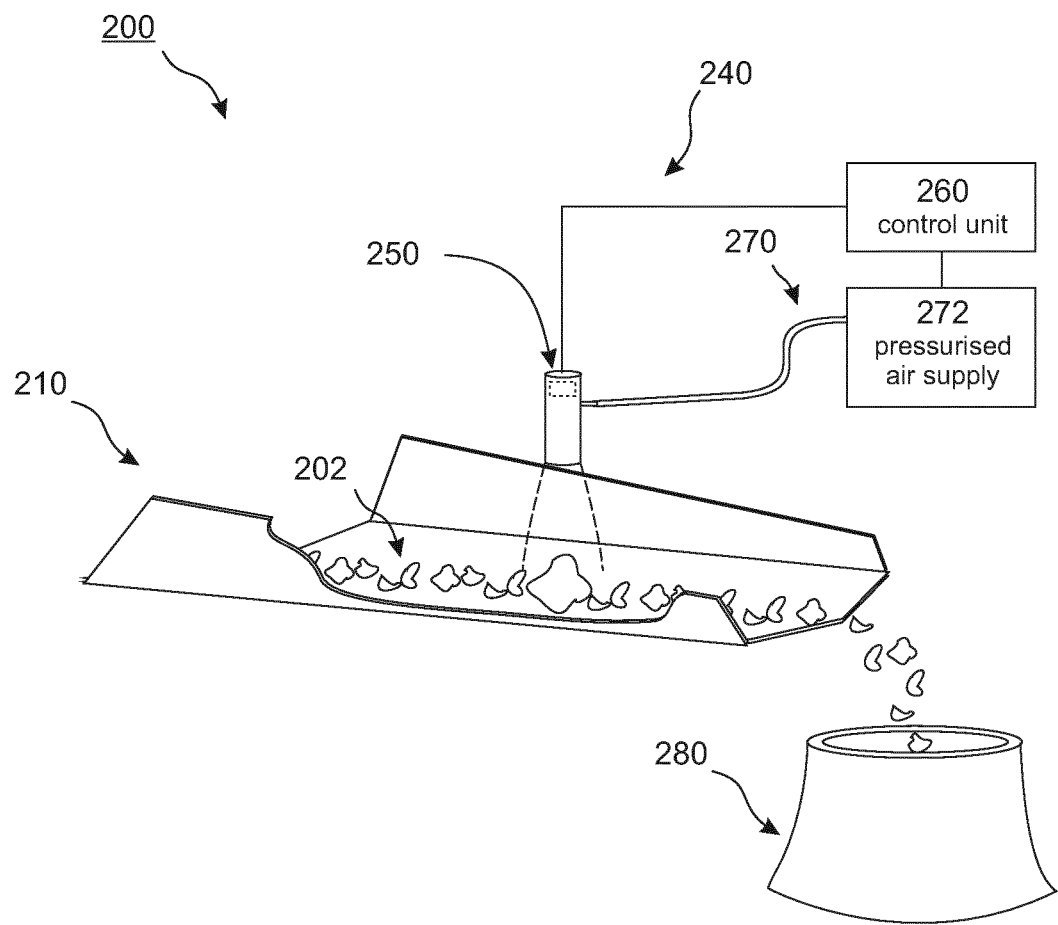
FIG. 2 is a perspective side view of an arrangement comprising a feeder and an ultrasonic detection system according to other embodiments of the disclosure. A portion of the feeder is cut away for increased clearness.

FIG. 2 shows an arrangement 200 according to another example embodiment. The arrangement 200 comprises a feeder 210. The feeder 210 is adapted to supply screening material 202 to a further device 280, such as for example a crusher. The arrangement 200 comprises an ultrasonic detection system 240 similar to the ultrasonic detection system of FIG. 1. The ultrasonic detection system 240 comprises an ultrasonic detection unit 250 arranged to detect the presence of oversized material that may risk getting jammed inside the further device 280.

Figure 3:
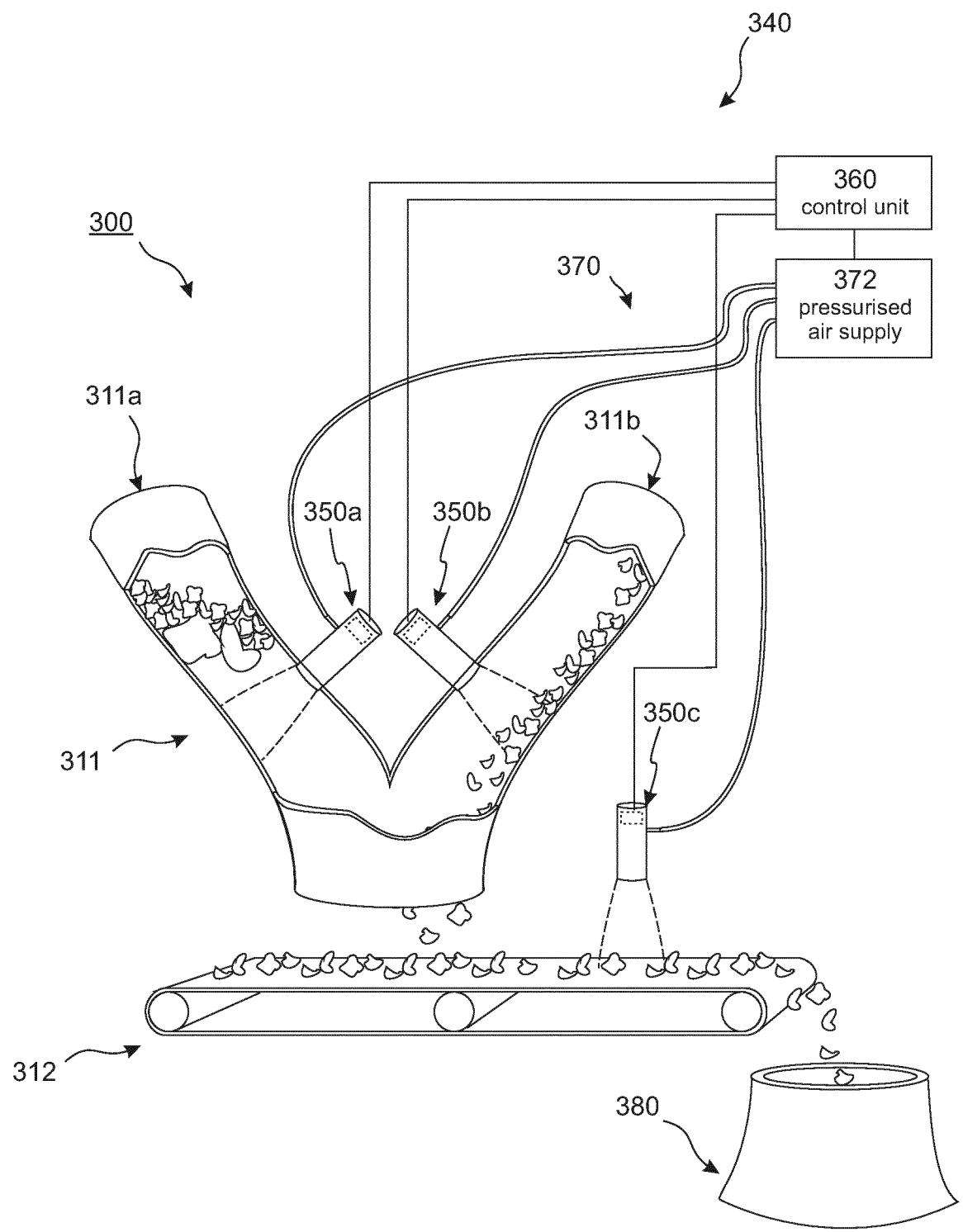
FIG. 3 is a perspective side view of an arrangement comprising a chute and an ultrasonic detection system according to yet other embodiments of the disclosure. A portion of the chute is cut away for increased clearness.

FIG. 3 shows an arrangement 300 according to another example embodiment. The arrangement 300 comprises a chute 311. The chute 311 is adapted to direct screening material 102 from one or more sources of screening material (in the example: two sources of screening material) to a conveyer belt 312. The conveyer belt 312 is adapted to transport screening material 302 received from the chute 311 to a further device 380, such as for example a crusher. The arrangement 300 comprises an ultrasonic detection system 340 similar to the ultrasonic detection system of FIG. 1. Although the example embodiment in FIG. 3 shows a chute comprising dual inlets, it is understood that a single inlet chute may equally well be equipped with an ultrasonic detection system of the disclosure.

The ultrasonic detection system 340 comprises a first ultrasonic detection unit 350a arranged to measure inside a first fork 311a of the chute 311 and a second ultrasonic detection unit 350b arranged to measure inside a second fork 311b of the chute 311. In the situation example shown in FIG. 3, screening material has gotten jammed inside the first fork 311a of the chute 311 whereas the screening material is free to move through the second fork 311b of the chute 311. Hence, the control unit 160 will obtain a different signal from the first ultrasonic detection unit 350a than from the second ultrasonic detection unit 350b. The control unit 160 may be operable to send out an alarm to inform about the jammed material inside the first fork 311a.

The ultrasonic detection system 340 further comprises a third ultrasonic detection unit 350c arranged to measure at a surface of the conveyor belt 312. The purpose of the third ultrasonic detection unit 350c is similar to the purpose of the ultrasonic detection unit 250 of FIG. 2, i.e. to detect larger pieces of screening material which risks getting jammed in the further device 380. Another purpose of the third ultrasonic detection unit 350c can be to detect jams in other parts of the process upstream from where the third ultrasonic detection unit 350c is placed. For example, if screening material is expected to be on the conveyer 312, but the third ultrasonic detection unit 350c does not detect the presence of material, it is likely to be a jam or other problem upstream, effectively hindering the material to enter the conveyer 312.

The arrangement 300 comprises a cleaning means 370 similar to the cleaning means 170 for the arrangement 100 discussed herein. Specifically, the first 350a, second 350b and third 350c ultrasonic detection units are all fluidly connected to a pressurised air supply 372. Moreover, the first 350a, second 350b and third 350c ultrasonic detection units are all connected to the control unit 360.

Figure 4:
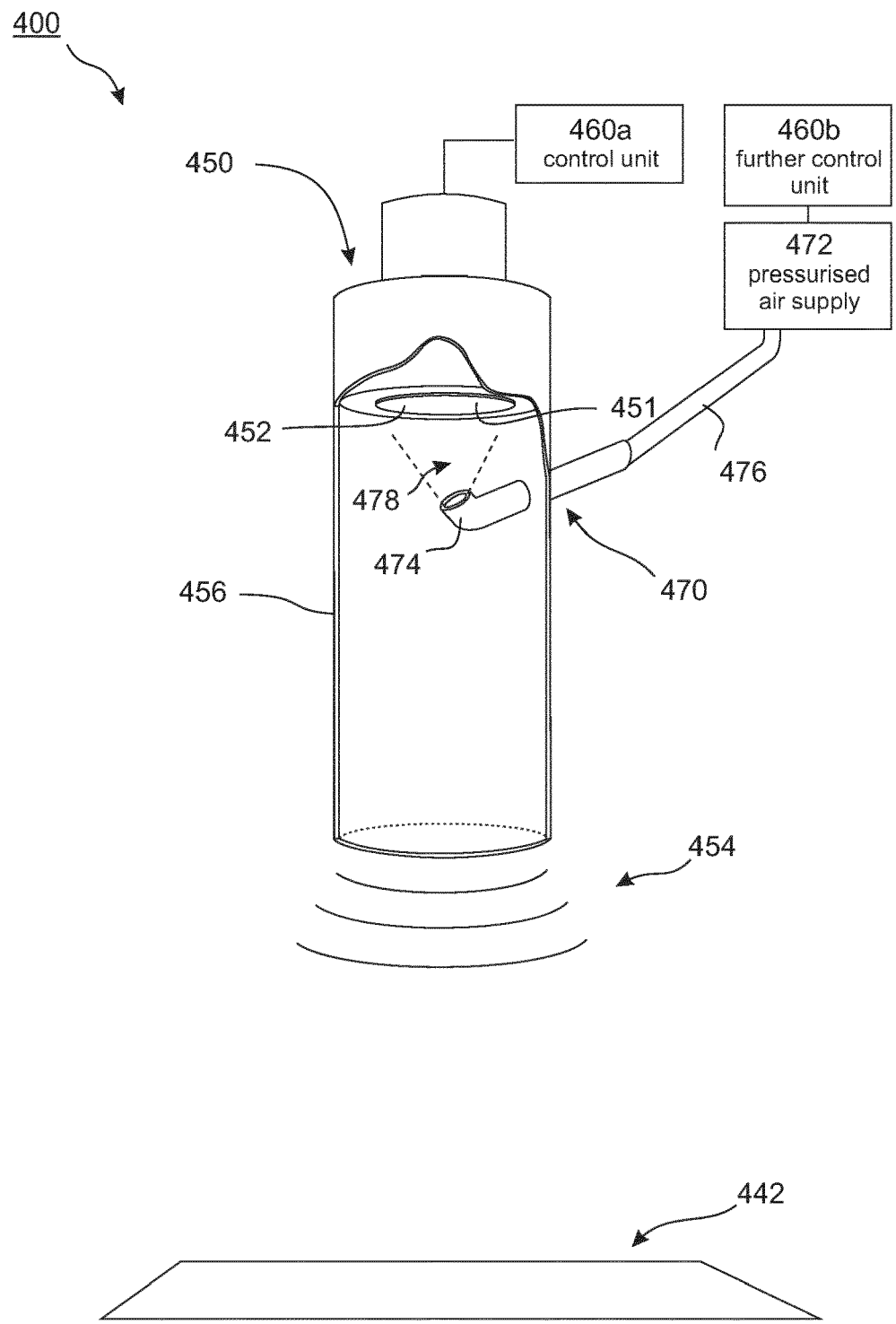
FIG. 4 is a perspective side view of a cleaning detection system in an arrangement for handling screening material according to embodiments of the disclosure. A portion of a protective case of the cleaning detection system is cut away for increased clearness.

The control unit 360 is adapted to control a cleaning process of the ultrasonic transmitters and/or the ultrasonic receivers of the first 350a, second 350b and third 350c ultrasonic detection units by means of the cleaning means 370. The control unit 360 may be adapted to control the cleaning process differently for different ultrasonic detection units. For example, the first 350a and second 350b ultrasonic detection unit may be supplied with a continuous flow of pressurised air to establish an over pressure within the protective cases of the ultrasonic detection units, whereas the third ultrasonic detection unit 350c may be supplied with pressurised air at predefined time intervals. FIG. 4 shows a cleaning detection system 400 in an arrangement for handling screening material, e.g. aggregate, ore or similar. The cleaning detection system 400 comprises an ultrasonic transmitter 451 arranged at a surface 442 of the arrangement, and adapted to send out an ultrasonic signal 454 towards the surface 442, an ultrasonic receiver 452 arranged at the surface 442, and adapted to receive the ultrasonic signal 454, and a protective case 456 at least partly housing the at least one ultrasonic transmitter 451 and the at least one ultrasonic receiver 452. The cleaning detection system 400 is characterised in that it further comprises a control unit 460a connected to the at least one ultrasonic transmitter 451 and the at least one ultrasonic receiver 452, and adapted to detect a difference in at least one parameter based on a comparison between the ultrasonic signal 454 and a reference signal.

The cleaning detection system 400 further comprises cleaning means 470 arranged at the protective case 456. The cleaning means 470 in turn comprises air blowing means adapted to clean the protective case 456. The air blowing means comprises a nozzle 474 arranged inside the protective housing 456. The nozzle 474 is fluidly connected to a pressurised air supply 472 by means of a conduit 476. The cleaning means 470 is connected to a further control unit 460b configured to control the operation of the cleaning means 470 for initiating a cleaning of the protective case 456. The further control unit 460b instructs the pressurised air supply 472 to supply pressurised air to the conduit 476 thus achieving a plume 478 of pressurised air to enter an interior portion of the protective housing 456. In the embodiment shown in FIG. 4, the nozzle 474 is shaped such as to supply the plume 478 of air in the direction of the ultrasonic transmitter 451 and the ultrasonic receiver 452. The position of the nozzle 474 may be adjustable such as to allow optimizing the cleaning of the protective case 456 and should be such that it does not interfere with the signal from and to the ultrasonic transceiver. The direction of flow may however be different in other embodiments.

The ultrasonic transmitter 451 and the ultrasonic receiver 452 is constituted by one single element, wherein the single element comprises a piezo element. Thus, the ultrasonic transmitter 451 and the ultrasonic receiver 452 is comprised in one single unit.

The signal 454 may be sent out in a direction substantially perpendicular to the surface 442 of the arrangement. The at least one parameter may be constituted by a time period, a frequency, and/or an amplitude of the ultrasonic signal 454.

The control unit 460a may be adapted to report that problem has been identified if the difference in the at least one parameter is outside of an acceptable interval.

As previously mentioned, the cleaning detection system 400 is a part of an arrangement for handling screening material, e.g. aggregate, ore or similar. Though not explicitly shown in FIG. 4, such an arrangement may comprise a plant, a screen, a screening deck, a conveyor belt, a chute, a feed box or a discharge box.

Figure 5:
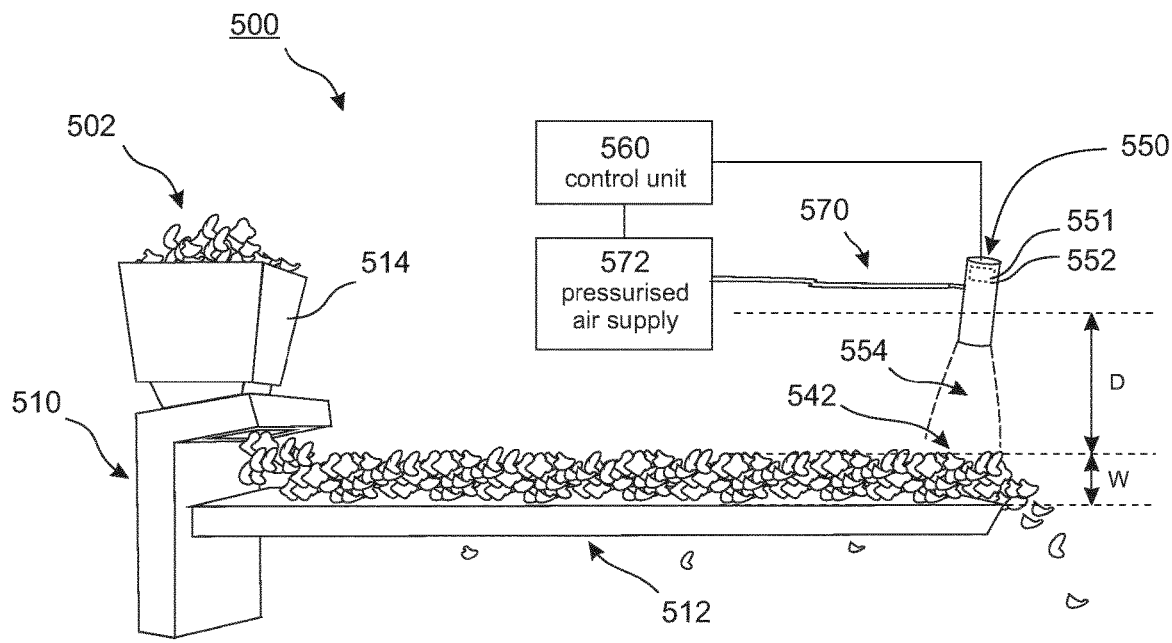
FIG. 5 is a perspective side view of a bed depth detection system in an arrangement comprising a screen according to embodiments of the disclosure.

FIG. 5 illustrates an arrangement 500 for handling screening material, e.g. aggregate, ore or similar, according to an example embodiment, which arrangement 500 comprising a bed depth detection system.

The arrangement 500 comprises a screen 510 comprising at least one screen deck 512. The at least one screen deck 512 is attached to vibrating means (not shown) arranged to cause a vibration of the at least one screen deck 512. The vibration causes the at least one screen deck 512 to be located at different positions at different times. Specifically, the vibration causes the at least one screen deck 512 to be located at different vertical positions for different times. The vibration means is not explicitly disclosed herein. It should be understood that many alternative ways exist for achieving said vibrations within the scope of the claims.

The screen 510 further comprises input means 514 arranged to input screening material onto the at least one screen 512. For the screen 510, the screening material 502 is input, via the input means 514, onto the at least one screen 512. The at least one screen deck 512 has a plurality of through holes covering a portion of its surface. As the at least one screen deck 512 vibrates, screening material 502 located thereon will be caused to move around. Pieces of the screening material 502 with dimensions smaller than the dimensions of the through holes are allowed to leave the at least one screen deck 512 via the plurality of through holes. Screening material with dimensions larger than the dimensions of the through holes of the at least one screen deck 512 is allowed to leave the at least one screen deck 512 at an end thereof, as illustrated in FIG. 5.

The arrangement 500 further comprises a bed depth detection system for detecting a bed depth W of the screening material 502. The bed depth detection system comprises an ultrasonic detection unit 550 and a control unit 560.

The ultrasonic detection unit 550 comprises an ultrasonic transmitter 551 arranged at a part, here a surface 542, of the arrangement 500 on or in relation to which the screening material is traveling, the ultrasonic transmitter 551 being adapted to send out an ultrasonic signal 554 towards the surface 542. The ultrasonic detection unit 550 further comprises an ultrasonic receiver 552 being adapted to receive the ultrasonic signal 554.

The control unit 560 is connected to the ultrasonic transmitter 551 and to the ultrasonic receiver 552, and is adapted to calculate a bed depth W of the screening material 502 present on the surface 542 from a comparison between the ultrasonic signal 554 and a reference signal based on at least one parameter.

The bed depth detection system further comprises a cleaning means 570 connected to the control unit 560 and arranged at the ultrasonic transmitter 551 and the ultrasonic receiver 552. The control unit 560 is adapted to control a cleaning process of the ultrasonic transmitter 551 and/or the ultrasonic receiver 552 by means of the cleaning means 570. The cleaning means 570 allows for using the bed depth detection system in harsh and dusty environment without risking detection efficiency to decrease during operation.

The cleaning means 570 comprises air blowing means having a pressurized air supply 572. The air blowing means is fluidly connected to the ultrasonic transmitter 551 and the ultrasonic receiver 552. The control unit 570 is adapted to control the pressurised air supply such as to inject pressurised air for keeping the ultrasonic transmitter 551 and the ultrasonic receiver 552 clean. The pressurized air may be injected as bursts occurring with regular time intervals. Alternatively, the pressurized air may be injected continuously. The control unit 570 may be adapted to control the flow of pressurized air through the conduits. This may be achieved by adjusting the air pressure of the pressurised air supply 572. Alternatively, or additionally, it may be achieved by adjusting the conduit cross section for example using a throttle or a variable valve.

In this specific embodiment, the ultrasonic transmitter 551 and the ultrasonic receiver 552 are constituted by one single piezo element, and the ultrasonic detection unit 550 is arranged such that the ultrasonic signal 554 is sent out in a direction substantially perpendicular to the surface 542 of the arrangement 500.

As stated above, the bed depth detection system is used for detecting the bed depth W of the screening material 502. A method for detecting a bed depth of a screening material 502 comprising the steps of sending out an ultrasonic signal 554 towards a surface 542 on or in relation to which the screening material is traveling, receiving the ultrasonic signal 554, and calculating the bed depth W of the screening material 502 present on the surface 542 from a comparison between the ultrasonic signal 554 and a reference signal based on at least one parameter.

The method may further comprise conducting a specific action if the calculated bed depth W is outside of an acceptable interval.

There are numerous ways of calculating the bed depth W of the screen material 502 based on information from the ultrasonic detection unit 550.

The at least one parameter may be constituted by a time period. In such a case, the bed depth detection system may be arranged to detect a distance to a target by determining a time delay between a time of transmitting and a time of receiving an ultrasonic signal 554 transmitted in a direction of the target. In this specific embodiment, the target is the material present on the surface 542.

That time delay can thereafter be compared with the corresponding time delay determined in view of a reference signal, which reference signal has transmitted and received in the corresponding manner as described above but during ideal circumstances, for example when the arrangement 500 is not in operation or in operation but without load.

Based on the difference in time delay, the bed depth W of the screening material 502 or the size of the objects present on the surface of the arrangement 500 can be calculated by means of the control unit 560.

Should the difference between the time period of the ultrasonic signal 554 and the reference signal deviate more than a predetermined error margin it can be concluded that there is an operating problem with the arrangement 500.

Alternatively, the at least one parameter may be constituted by a frequency of the ultrasonic signal 554. In such a case, the bed depth detection system may be arranged to detect a speed of a target with respect to the be depth detection system. The speed of the target may be calculated with knowledge of the speed of sound by utilizing the formulation of the Doppler effect for sound waves.

Alternatively, the at least one parameter may be constituted by an amplitude of the ultrasonic signal 554.

Although discussed separately, any combination of the properties of time, frequency and amplitude may be used to achieve a purpose of the bed depth detection system. Other properties may also be used. For example, the spatial distribution of the signal 554 may be used to infer properties of the target. For such a case, the ultrasonic receiver 552 may comprise a spatially resolving sensor. Furthermore, the properties of the ultrasonic signal 554 transmitted by the ultrasonic transmitter 551 may be different depending on the purpose. For example, the signal may be pulsed or continuous. Furthermore, the base frequency of the ultrasonic signal 554 may vary dependent on the purpose.

The control unit 560 may be adapted to detect a difference in the at least one parameter based on a comparison between the ultrasonic signal 554 and a reference signal. The reference signal may be for example the signal detected by the control unit 560 in a case where no screening material 502 is affecting the signal 554. For example, a reference signal may be recorded and stored when the arrangement 500 is not in operation or in operation without load. Alternatively, or additionally, a reference signal may be the signal detected by the control unit 560 for a specific position of a vibrating screen 510. For example, the reference signal may be the signal detected by the control unit 560 when a screen deck 512 is unloaded in its default position.

By measuring the bed depth W of the screening material 502 on the screen 510 many important parameters related to the screening process can be calculated. These parameters can be used to optimize the process, investigate if the screen is overloaded, or underloaded, compared to specification, calculate and predict the wear life of screening media etc.

Several mathematical models exist for calculating the capacity for a given bed depth W. By using these mathematical models, the efficiency of the screen 510 can be calculated in order to find out how it is operating. This information can be used to optimize the screening process. For a given capacity it is also possible to give recommendations of a suitable bed depth W for the screen 510. The system can give a warning if the bed depth is too high or too low compared to set levels.

The information can also be used to calculate the wear life of the screening media. It is always very important for the user to know how much screening material each screen deck 512 can handle before it has to be replaced. This means that the downtime for maintenance and replacement can be predicted and minimized to save money. This type of information is also vital so that the supplier can deliver screening media to the user exactly when it is needed. It is for example possible to use the system during planned downtime occasions, when the screen decks are free from screening material. By measuring the distance to the surface of the screening deck and compare readings over time, it is possible to determine how much the screening deck has been worn and knowing the initial thickness of the screening media, it is possible with a high degree of certainty to determine when it is time to replace screening media. Either all or only some of the screening media modules may be replaced at a same time. The information can be used to predict wear rate and wear life in both hours and tons and connect predicted wear with actual wear.

Figure 6:
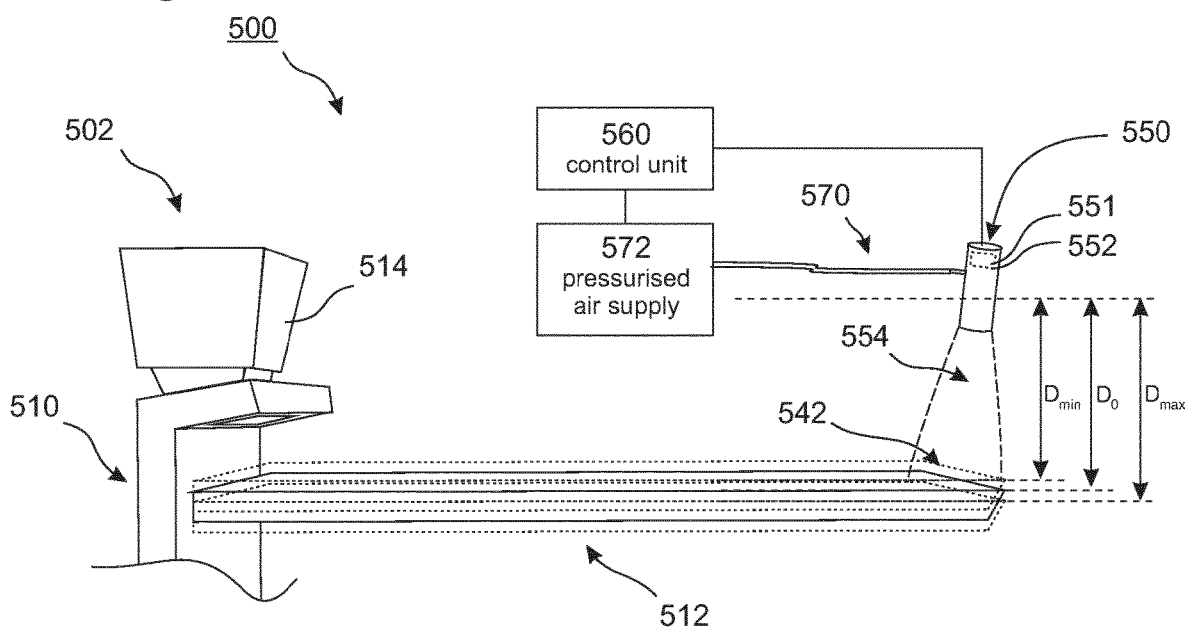
FIG. 6 is a perspective side view of the bed depth detection system in the arrangement comprising the screen shown in FIG. 5, wherein the bed depth detection system is adapted to measure a characteristic of the screen.

FIG. 6 illustrates the arrangement 500 for a purpose of monitoring the operation of the screen 510. The screen 510 is here shown empty from any screening material 502. It is however envisioned that screening material 502 may be present on the screen, at least to some extent. FIG. 6 aids to illustrate that the bed depth detection system may be used to monitor the movement of the at least one screen deck 512 in relation to the bed depth detection system. Specifically, the bed depth detection system may be used to measure the stroke of the vibrating at least one screen deck 512. For the arrangement 500, the stroke may be determined in the vertical dimension by detecting the distance between the bed depth detection system and the screen for different positions of the screen 510. The maximum stroke in the vertical direction will be the difference between the maximum distance $D_{max}$ and the minimum distance $D_{min}$. The bed depth detection system may also be used to detect temporal fluctuations in the vibrational motion of the at least one screen deck 512.

A purpose of detecting the vibrational characteristics of the at least one screen deck 512 is to identify unwanted behaviour of the screen. One example of such an unwanted behaviour is when the screen deck 512 is vibrating at or close to an eigenfrequency of the at least one screen deck 512, a situation which significantly increases the risk of introducing a screen malfunction. Another example concerns the influence of the screening material 502 on the vibrational characteristics. For example, if the screening material 502 present on the at least one screen deck 512 constitutes an excessive load and/or some pieces are of a dimension not expected, the stroke may be effected. This implies that the bed depth detection system may be used to measure on the screening material 502 indirectly as a result from the screening material 502 affecting the vibrational characteristics of the at least one screen 512.

Figure 7:
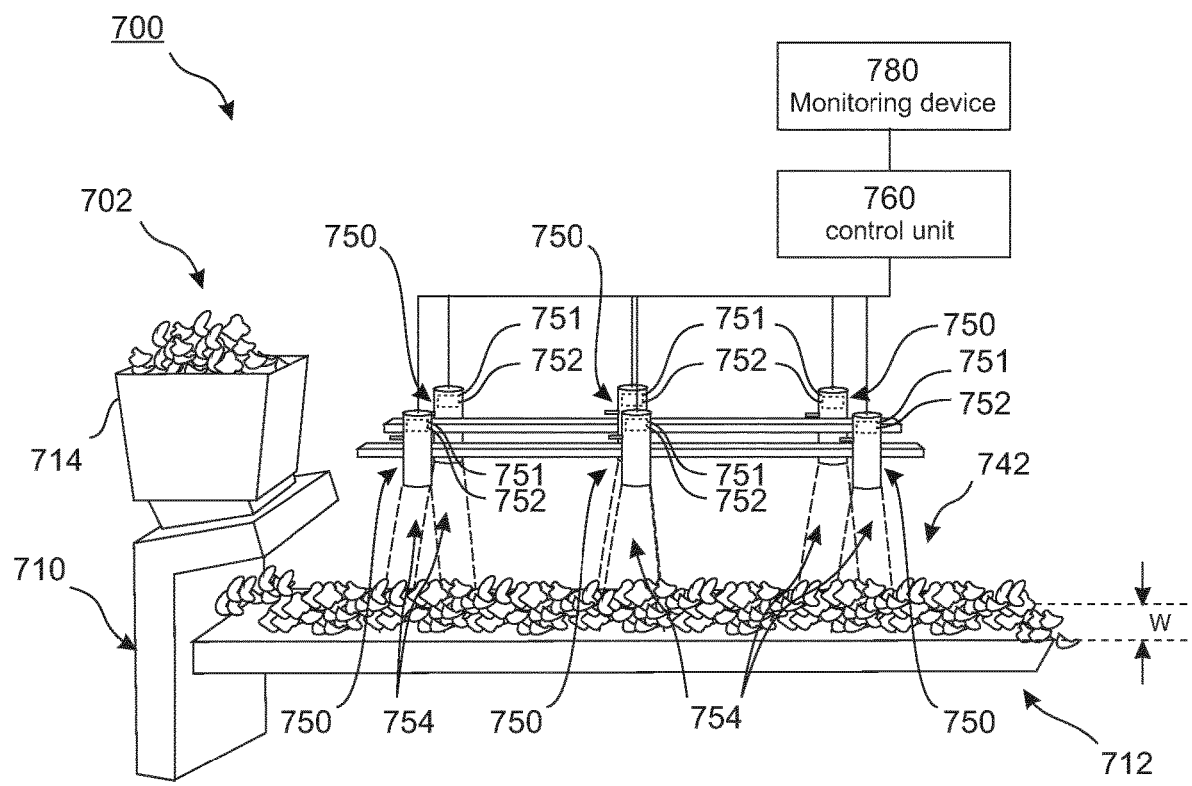
FIG. 7 is a perspective view of a detection system in the arrangement comprising a mesh comprising a plurality of ultrasonic transmitters and ultrasonic receivers over a surface of a screening deck of the arrangement.

FIG. 7 illustrates an arrangement 700 for handling screening material, e.g. aggregate, ore or similar, according to an example embodiment, which comprises a mesh comprising a plurality of ultrasonic transmitters and ultrasonic receivers, respectively.

The arrangement 700 comprises a screen 710 having at least one screening deck 712. The arrangement further comprises input means 714 arranged to input screening material onto the at least one screening deck 712.

In this exemplifying embodiment, the arrangement 700 is provided with a mesh comprising six ultrasonic detection units 750, each ultrasonic detection unit 750 comprising an ultrasonic transmitter 751 adapted to send out an ultrasonic signal 754 towards the surface 742 of the at least one screening deck 712. Each ultrasonic detection unit 750 further comprises an ultrasonic receiver 752 adapted to receive the ultrasonic signal 754. The ultrasonic detection units 750 are distributed over the surface of the screening deck 712.

The control unit 760 is connected to each of the ultrasonic transmitters 751 and the ultrasonic receivers 752, and is adapted to detect at least one parameter of the ultrasonic signal of each ultrasonic detection unit. An example of such a parameter is the bed depth W of the screening material 702 present on the surface 742.

The control unit 760 may be adapted to detect a difference in the at least one parameter of the ultrasonic signal of each of the ultrasonic detection units based on a comparison between the respective ultrasonic signal 754 and a reference signal.

The control unit 760 may further be connected to a monitoring device 780 for monitoring the at least one parameter of the ultrasonic signal 754 of each of the ultrasonic detection units 750. The parameter detected, for example the bed depth W, by each of the ultrasonic detection units 750 can thereby be monitored and followed in real time.

A method of monitoring the calculated bed depth, previously discussed in this disclosure, from ultrasonic signals from the mesh comprising a plurality of ultrasonic transmitters and receivers can provide a considerable amount of useful information. For example, when monitoring the calculated bed depth from ultrasonic signals from portions at left and right hand sides of the surface of a screening deck of the arrangement, it may be detected that one of the signals provides a higher calculated bed depth than the other. If a value of the calculated bed depth is continuously larger for one signal, this suggests there is a non-uniform material distribution on the screening deck, and thus a poor feed distribution of the material. If the monitored value of the calculated bed depth is near a pre-set upper limit, this suggests that the screening deck at least at the corresponding portion of the surface is overloaded.

If a value of the calculated bed depth varies significantly, this may suggest that the ultrasonic signal does not hit the surface it is set to measure perpendicularly resulting in an echo of the signal. It can thus be deduced that the screen is tilting, for example due to a missing spring or other support structure of the screen.

Figure 8:
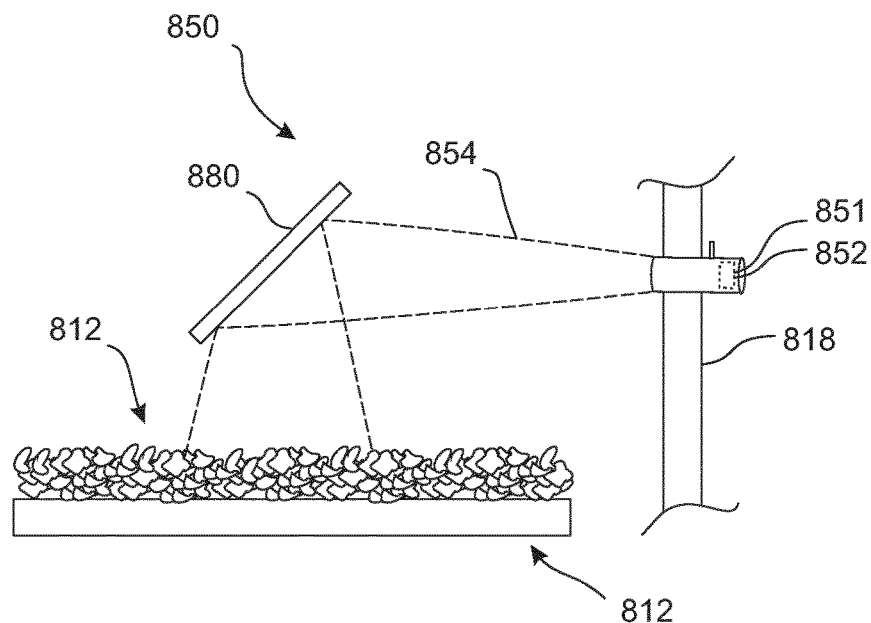
FIG. 8 is a schematic side view of a detection system in the arrangement comprising a reflector for deflecting the ultrasonic signal towards a surface which is at an angle from the plane of the ultrasonic transmitter and the ultrasonic receiver.

FIG. 8 illustrates an example embodiment of a part of an ultrasonic detection system in an arrangement 800 comprising at least one reflector 880. The illustrated arrangement 800 comprises at least one screen deck 812. The arrangement further comprises a screen wall 818 at an end of the screen deck 812.

The arrangement 800 further comprises an ultrasonic detection unit 850 arranged at the screen wall 818. The ultrasonic detection unit 850 may, however, be arranged at another position of the arrangement. The ultrasonic detection unit 850 comprises an ultrasonic transmitter 851 adapted to send out an ultrasonic signal 854 in a horizontal plane, and an ultrasonic receiver 852 adapted to receive the ultrasonic signal 854. The ultrasonic detection unit 850 further comprises a reflector 880, arranged at or close to the at least one screen deck 812, and horizontally at a distance of the ultrasonic detection unit 850. The reflector 880 is, in this exemplifying embodiment, arranged at an angle of 45° with respect to the horizontal plane, such that it can deflect the ultrasonic signal 854 from the ultrasonic transmitter 851 towards the screen deck 812. Correspondingly, the reflector can deflect the ultrasonic signal 854 reflected back from the screening deck towards the ultrasonic receiver 852. The reflector thus allows deflecting the ultrasonic signal 854 towards a surface which is vertical to the plane in which the ultrasonic detection unit 850 is arranged.

By arranging the reflector in different angles, the ultrasonic signal 854 can be deflected towards surfaces at different angles from the plane of the ultrasonic detection unit 850. The reflector thus provides the advantage of enabling access for the ultrasonic signal to locations of the arrangement 800 which are hard to reach due to lack of space or structures for mounting the ultrasonic transmitter and the ultrasonic receiver, or to harsh operating conditions.

The skilled person realizes that a number of modifications of the embodiments described herein are possible without departing from the scope of the invention, which is defined in the appended claims. For example, in an alternative embodiment, laser scanning could be used to detect a problem in the arrangement, based on a calculated bed depth of a screening deck of the arrangement, or on the material distribution thereon.

It is also conceivable to use radar equipment instead of ultrasonic units. By using radar, it is possible to measure the same things as with ultrasonic units and, additionally, radar allows for measuring and investigating the different layers of the bed depth. It will also allow for analysis and evaluation of particle size distribution in a bed, even during operation of a screen. By using radar equipment, it is also possible to cover the entire surface, or at least a large part, of e.g. a screen deck with a single unit.

It is also possible to arrange sensors behind the screen deck for making measurements between or below a screen deck. It would thereby be possible to measure the density, or with other words the amount of material which falls from a screen deck, thus deducing the tonnage per time unit. A stronger echo would imply more material passing through the screening deck whereas a weaker echo would imply less material passing through. This could then be evaluated as to how much material passing through a given screen deck in relation to a theoretical content of undersize particle in the material fed to the screening arrangement. The information thus obtained could be used to evaluate the distribution of screening material load per screen deck, but also for estimation of screening efficiency. It also provides information as to how plugged a screen deck has become in comparison with a fully open screen deck.

It is also possible to determine and evaluate blinding and pegging with the present invention. Even though they both have the same end effect, plugging of the screening media, these are two different problems. Blinding occurs when fine particles stick together and create something similar to a sticky paste blocking the openings of the screening media whereas pegging occurs when a larger particle, typically of irregular shape, enters an opening of the screening media but is unable to pass through. With the present invention, it is not only possible to determine that blinding and/or pegging has occurred. It is also possible to determine how big the affected area is and also the build-up, i.e. the height, of the blinding can be determined.

The invention claimed is:

1. An arrangement for handling screening material, e.g. aggregate, ore or similar, said arrangement comprising:
a screening deck and/or a screening duct on or in relation to which screening material is traveling; and
an ultrasonic detection system comprising:
a mesh comprising a plurality of ultrasonic transmitters and ultrasonic receivers;
at least one of the plurality of ultrasonic transmitters arranged at the arrangement, and adapted to send out an ultrasonic signal towards a surface of the screening deck on which screening material is traveling in order to detect at least one parameter;
at least one of the plurality of ultrasonic receivers adapted to receive the ultrasonic signal;
a control unit connected to the at least one of the plurality of the ultrasonic transmitters and the at least one of the plurality of the ultrasonic receivers, the control unit being adapted to detect the at least one parameter of the ultrasonic signal;
wherein the control unit further is adapted to detect a difference in the at least one parameter based on a comparison between the ultrasonic signal and a reference signal;
wherein each of the plurality of ultrasonic transmitters and ultrasonic receivers of the mesh are:
arranged over the surface of the screening deck of the arrangement, or
arranged proximate the surface of the screening deck of the arrangement and
wherein a reflector is arranged for deflecting the ultrasonic signal towards said surface of the screening deck.

2. The arrangement according to claim 1, further comprising cleaning means connected to the control unit and arranged at a corresponding one of the ultrasonic transmitters and a corresponding one of the ultrasonic receivers, wherein the control unit is adapted to control a cleaning process of the corresponding ultrasonic transmitter and/or the corresponding ultrasonic receiver using the cleaning means.

3. The arrangement according to claim 2, wherein the cleaning means comprises air blowing means.

4. The arrangement according to claim 1, wherein the control unit is adapted to report that problem has been identified if the difference in the at least one parameter is outside of an acceptable interval.

5. The arrangement according to claim 1, further comprising a protective case at least partly housing at least one of the ultrasonic transmitters and at least one of the ultrasonic receivers.

6. The arrangement according to claim 1, wherein one or more of the ultrasonic transmitters and/or one or more of the ultrasonic receivers comprises a piezo element.

7. The arrangement according to claim 1, wherein the at least one parameter is constituted by a frequency of the ultrasonic signal.

8. The arrangement according to claim 1, wherein at least one of the ultrasonic transmitters and a corresponding one of the ultrasonic receivers are constituted by one single element, the single element comprising a piezo element.

9. The arrangement according to claim 1, wherein the at least one parameter is constituted by a time period.

10. The arrangement according to claim 1, wherein the at least one parameter is constituted by an amplitude of the ultrasonic signal.

11. The arrangement according to claim 1, wherein the reflector is arranged at a distance from the corresponding ultrasonic transmitter and the corresponding ultrasonic receiver, and at a structure of the arrangement different from the structure at which the corresponding ultrasonic transmitter and the corresponding ultrasonic receiver are arranged.

12. The arrangement according to claim 1, wherein the reflector is arranged at the same structure of the arrangement as the corresponding ultrasonic transmitter and the corresponding ultrasonic receiver.

13. The arrangement according to claim 1, wherein the reflector is arranged at a non-vibrating structure of the arrangement.

14. The arrangement according to claim 1, wherein the reflector is arranged at a vibrating structure of the arrangement.

15. The arrangement according to claim 1, wherein the reflector is arranged at an angle of 45° with respect to the plane in which the corresponding ultrasonic transmitter is arranged.

16. The arrangement according to claim 1, wherein the corresponding ultrasonic transmitter, the corresponding ultrasonic receiver, and the reflector are comprised in one single unit, wherein the single unit is at least partly covered.

17. The arrangement according to claim 1, wherein two or more ultrasonic transmitters and two or more ultrasonic receivers are provided at different positions in the arrangement.

18. The arrangement according to claim 1, further comprising a plant, a screen, a screening deck, a conveyor belt, a chute, a feed box or a discharge box.

19. A screen for screening material, e.g. aggregate, ore or similar, which screen has a screen frame and screen elements arranged in the screen frame, and comprises the arrangement according to claim 1.

20. The arrangement according to claim 1, wherein the at least one parameter comprises a bed depth of the screening material on the surface.

21. The arrangement according to claim 20, wherein the control unit is configured to calculate the bed depth from two or more ultrasonic signals and detect a problem in the arrangement based on the monitored bed depth.

22. The arrangement according to claim 1, wherein the reflector is configured to deflect the ultrasonic signal reflected back from the surface of the screening deck to the ultrasonic receiver.

23. A method for monitoring operation of an arrangement for handling screening material, e.g. aggregate, ore or similar, the method comprising the steps of:
   sending out an ultrasonic signal from an ultrasonic transmitter towards a surface of the arrangement on which screening material is traveling;
   receiving the ultrasonic signal by an ultrasonic receiver;
   detecting at least one parameter of the ultrasonic signal; and
   wherein the method further comprises the step of monitoring a bed depth calculated from two or more ultrasonic signals and detecting a problem in the arrangement based on the monitored bed depths.

24. The method according to claim 23, further comprising the step of calculating a bed depth of the screening material present on the surface based on a comparison between the ultrasonic signal and a reference signal based on the at least one parameter.

25. The method according to claim 23, wherein the problem detected is a tilting screen of a screen deck of the arrangement, caused by a support structure of the screening, e.g. a spring.

26. The method according to claim 23, wherein the problem is an overload of a screening deck of the arrangement.

27. The method according to claim 23, wherein the problem is an undesired material distribution on a screening deck of the arrangement.

28. The method according to claim 23, further comprising the steps of comparing the ultrasonic signal with a reference signal based on the at least one parameter, and conducting a specific action if a difference in the at least one parameter between the ultrasonic signal and the reference signal is outside of an acceptable interval.

\* \* \* \* \*